(12) United States Patent  (10) Patent No.: US 8,058,829 B2
Anderson  (45) Date of Patent: Nov. 15, 2011

(54) MACHINE CONTROL SYSTEM AND METHOD

(75) Inventor: Randall T. Anderson, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 406 days.

(21) Appl. No.: 12/292,748

(22) Filed: Nov. 25, 2008

(65) Prior Publication Data

US 2010/0127654 A1 May 27, 2010

(51) Int. Cl.
*H02P 7/00* (2006.01)
(52) U.S. Cl. ............... 318/432; 318/433; 318/434
(58) Field of Classification Search ........ 318/432, 318/433, 434; 701/54, 84; 180/648, 197
See application file for complete search history.

(56) References Cited

U.S. PATENT DOCUMENTS

| | | |
|---|---|---|
| 3,795,107 A | 3/1974 | Ward |
| 3,803,841 A | 4/1974 | Erickson et al. |
| 3,914,938 A | 10/1975 | Cornell et al. |
| 3,946,560 A | 3/1976 | Mac Intosh et al. |
| 4,019,596 A | 4/1977 | Crull |
| 4,085,812 A | 4/1978 | Robinson et al. |
| 4,086,767 A | 5/1978 | Byers, Jr. |
| 4,126,994 A | 11/1978 | Rockwell |
| 4,165,613 A | 8/1979 | Bernhoft et al. |
| 4,399,886 A | 8/1983 | Pollman |
| 4,400,935 A | 8/1983 | Louis |
| 4,465,942 A | 8/1984 | Deicke |
| 4,606,005 A | 8/1986 | Ribbens |
| 4,689,955 A | 9/1987 | Lietzke |
| 4,739,616 A | 4/1988 | Myers |
| 4,934,985 A | 6/1990 | Strubbe |
| 5,203,168 A | 4/1993 | Oshina et al. |
| 5,270,578 A | 12/1993 | Yamamura |
| 5,416,702 A | 5/1995 | Kitagawa et al. |
| 5,447,029 A | 9/1995 | Swick et al. |
| 5,845,221 A | 12/1998 | Hosokawa et al. |
| 6,217,479 B1 | 4/2001 | Brown et al. |
| 6,377,884 B1 | 4/2002 | Loeffler et al. |
| 6,472,772 B2 | 10/2002 | Onizuka et al. |
| 6,536,402 B2 | 3/2003 | Houchin et al. |
| 6,581,565 B2 | 6/2003 | Heslop et al. |
| 6,675,577 B2 | 1/2004 | Evans |
| 6,700,386 B2 | 3/2004 | Egami |
| 6,704,638 B2 | 3/2004 | Livshiz et al. |
| 6,807,474 B2 | 10/2004 | Bergqvist et al. |
| 6,819,997 B2 | 11/2004 | Buchanan et al. |
| 6,842,686 B2 | 1/2005 | Homeyer et al. |
| 6,859,711 B2 | 2/2005 | Eckert et al. |
| 6,986,398 B2 | 1/2006 | Obayashi |
| 7,098,555 B2 | 8/2006 | Glahn et al. |
| 7,137,347 B2 | 11/2006 | Wong et al. |
| 7,146,263 B2 | 12/2006 | Guven et al. |
| 7,240,487 B2 | 7/2007 | Diaz et al. |
| 7,260,931 B2 | 8/2007 | Egelja et al. |
| 7,310,943 B2 | 12/2007 | Burgart et al. |
| 2004/0267436 A1 | 12/2004 | Prodi et al. |
| 2005/0057208 A1 | 3/2005 | Seibel et al. |
| 2005/0171669 A1 | 8/2005 | Sato |
| 2007/0068220 A1* | 3/2007 | Mahajan et al. ............ 73/9 |
| 2007/0141999 A1 | 6/2007 | Przywecki |

* cited by examiner

*Primary Examiner* — Karen Masih
(74) *Attorney, Agent, or Firm* — Finnegan, Henderson, Farabow, Garrett & Dunner LLP

(57) ABSTRACT

An electronic control module for a machine may include instructions for performing a method. The method may include obtaining a total torque load limit for one or more hydrostatic transmission loops in the machine. The method may also include allocating the total torque load limit between the one or more hydrostatic transmission loops in the form of one or more lower level torque load limits.

18 Claims, 11 Drawing Sheets

MACHINE CONTROL SYSTEM AND METHOD

TECHNICAL FIELD

This disclosure relates generally to a control system for a machine, and more particularly, to a control system for controlling the operation of torque consuming devices in the machine.

BACKGROUND

Machines such as, for example, wheeled loaders, tracked loaders, track type tractors, and other types of heavy machinery, may be used for a variety of tasks. These machines may include a prime mover, which may include, for example, an engine, such as a diesel engine, gasoline engine, or natural gas engine that provides the power required to perform tasks using one or more torque consuming devices.

When the torque consuming devices require an increase in torque, a demand for increased power may be placed on the engine. Similarly, when the torque consuming devices require less torque, a demand for decreased power may be placed on the engine. Such changes in demand are traditionally countered by increasing or decreasing fuel delivery to the engine. However, due to response delays of various engine systems and the relative immediacy of changes in demand, engine speed may either droop under or shoot over a desired engine speed. Another difficulty associated with torque consuming devices is that operation of these devices may produce loads on the engine that may be severe enough to cause stalling or lugging of the engine, collectively referred to as excessive engine speed droop. Lugging or stalling the engine may decrease the productivity and efficiency of the engine. The torque consuming devices may also become unstable because the time required for the engine to respond to the changes in demand can be greater than the demand period.

One attempt to control machine operation is described in U.S. Pat. No. 7,146,263 B2 to Guven et al. ("Guven"). Guven discloses a method for predictive load management. In Guven, a control system is operable to receive at least one input indicative of a load on a transmission and to identify a desired load of the transmission based on the at least one input. The control system is also operable to receive at least one input indicative of current power output of a power source. The control system limits the desired transmission load applied to the driven member of the transmission based on the current power output of the power source to thereby prevent the power source from operating outside of the desired operating range. However, the method in Guven may be inefficient.

The disclosed system and method is directed at overcoming one or more of the problems set forth above.

SUMMARY

According to one aspect of this disclosure an electronic control module for a machine is disclosed, including instructions for performing a method. The method may include obtaining a total torque load limit for one or more hydrostatic transmission loops in the machine. The method may also include allocating the total torque load limit between the one or more hydrostatic transmission loops in the form of one or more lower level torque load limits.

According to another aspect of this disclosure an electronic control module for a machine is disclosed, including instructions for performing a method. The method may include determining a torque load limit for a torque consuming element. The method may also include determining a pressure limit for the torque consuming element based at least in part on the torque load limit. The method may further include determining a displacement for the torque consuming element based at least in part on the pressure limit. The method may further include operating the torque consuming element at the determined displacement.

According to yet another aspect of this disclosure, a machine is disclosed. The machine may include a prime mover configured to generate torque. The machine may also include a torque consuming device configured to consume torque generated by the prime mover. The machine may further include a control system. The control system may be operable to obtain a torque load limit for a torque consuming element of the torque consuming device based at least in part on the torque generated by the prime mover. The control system may also be operable to obtain a pressure limit for the torque consuming element based at least in part on the torque load limit. The control system may be further operable to obtain a displacement for the torque consuming element based at least in part on the pressure limit. The control system may be further operable to operate the torque consuming element at the obtained displacement.

DETAILED DESCRIPTION

An exemplary deployment of the disclosure is in a machine. In the embodiment described below, a tracked loader is disclosed. However, it can be appreciated that other types of machines can benefit from the embodiments disclosed herein, including, for example, any type of ground-borne vehicle, such as an automobile, a truck, an agricultural vehicle, and/or a construction vehicle, such as, a wheel loader, a dozer, a track type tractor, an excavator, a grader, an on-highway truck, an off-highway truck, and/or any type of machine known to persons skilled in the art.

Figure 1:
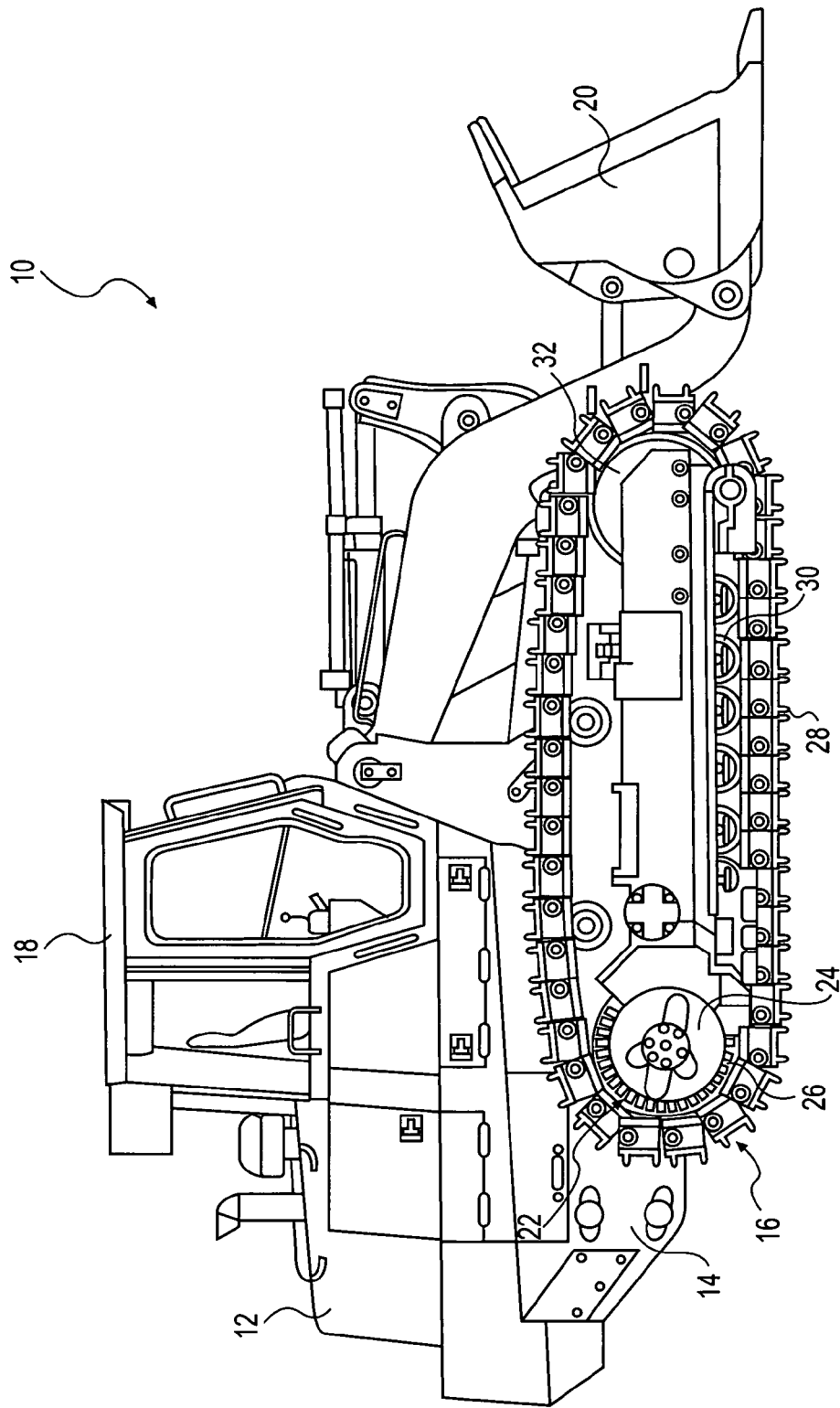
FIG. 1 is an illustration of an exemplary machine according to one aspect of the disclosure.

An exemplary tracked loader machine 10, shown in FIG. 1, may include a prime mover 12 connected to a frame or chassis 14, a traction assembly 16, a cab 18, an implement 20, and/or any other machine components known to persons skilled in the art.

Prime mover 12 may include any assembly that generates power, such as an internal combustion engine, including but not limited to a spark-ignition engine, a compression ignition engine, a rotary engine, a gas turbine engine, and/or an engine powered by gasoline, diesel fuel, bio-diesel, ethanol, methanol, and combinations thereof. Prime mover 12 may also include a hydrogen-powered engine, a fuel cell, a solar cell, and/or any other power source known to persons skilled in the art.

Prime mover 12 may provide power for devices in machine 10, including, for example, transmission components 22. Transmission components 22 may include a hydrostatic pump (not shown) configured to operate a propel motor 24. Propel motor 24 may drive a gear 26, which may be meshed with a track 28 of traction assembly 16. When gear 26 rotates, track 28 may be urged to rotate and propel machine 10 across terrain. Track 28 may rotate around a series of pulleys 30 and a free rotating drum 32, configured to align track 28 with chassis 14. Machine 10 may be propelled either forward or in a reverse direction depending on the direction of rotation of gear 26.

Cab 18 may contain various controls for machine 10, a seat for a machine operator, and an operator interface. The operator interface may include one or more control devices configured to permit the operator to make requests for controlling the speed and direction of travel of machine 10, and/or requests for manipulating implement 20. For example, the operator interface may include a steering device, a joystick, hand or foot operated levers, and any other control devices known to persons skilled in the art.

Figure 2:
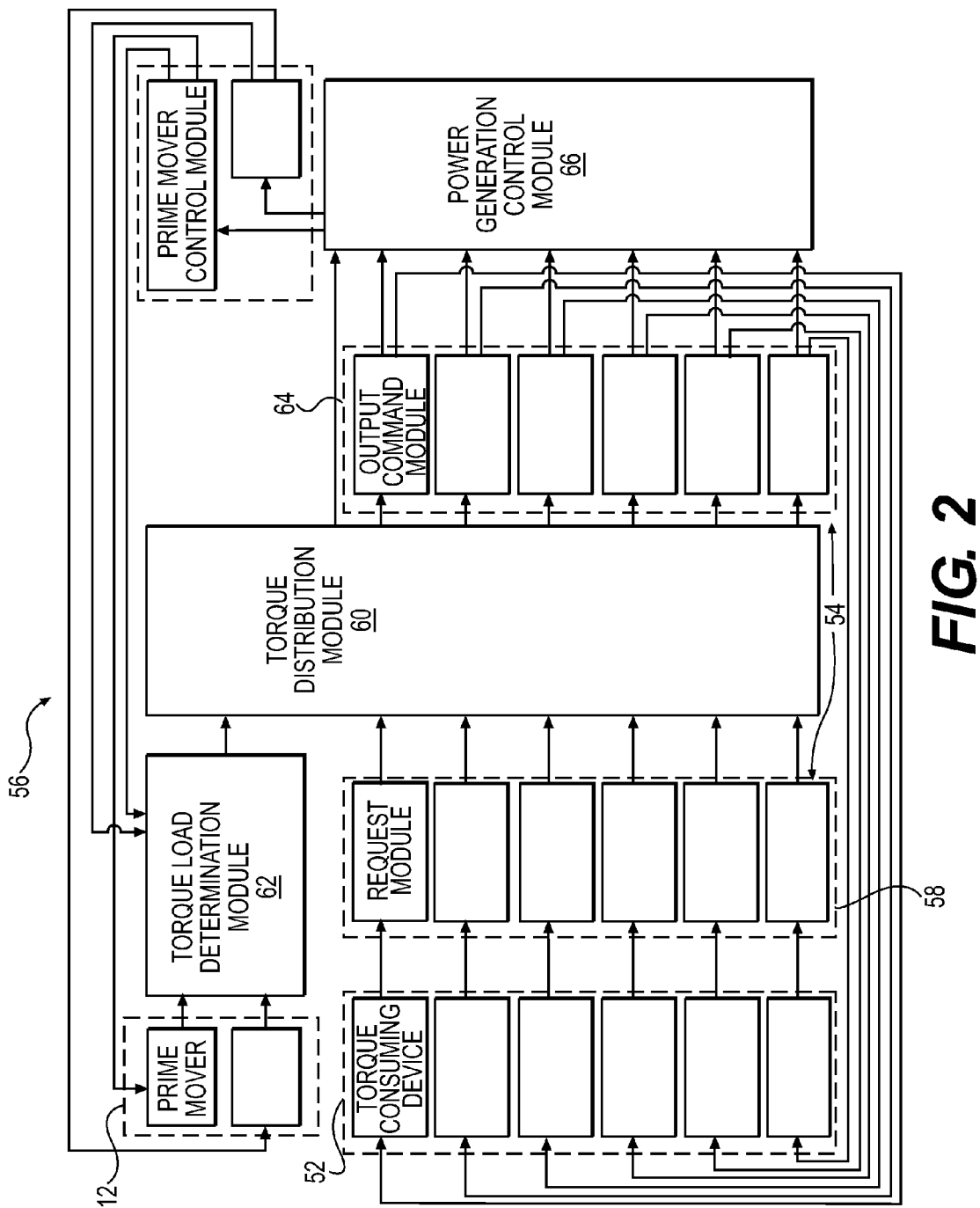
FIG. 2 is a control schematic according to another aspect of the disclosure.

Machine 10 may include one or more torque consuming devices 52, represented schematically in FIG. 2. Torque consuming devices 52 may include any devices on machine 10 configured to transform an input, such as power from prime mover 12, into an output, such as operation of implement 20, traction assembly 16, and/or any other change in the state of machine 10.

Figure 3:
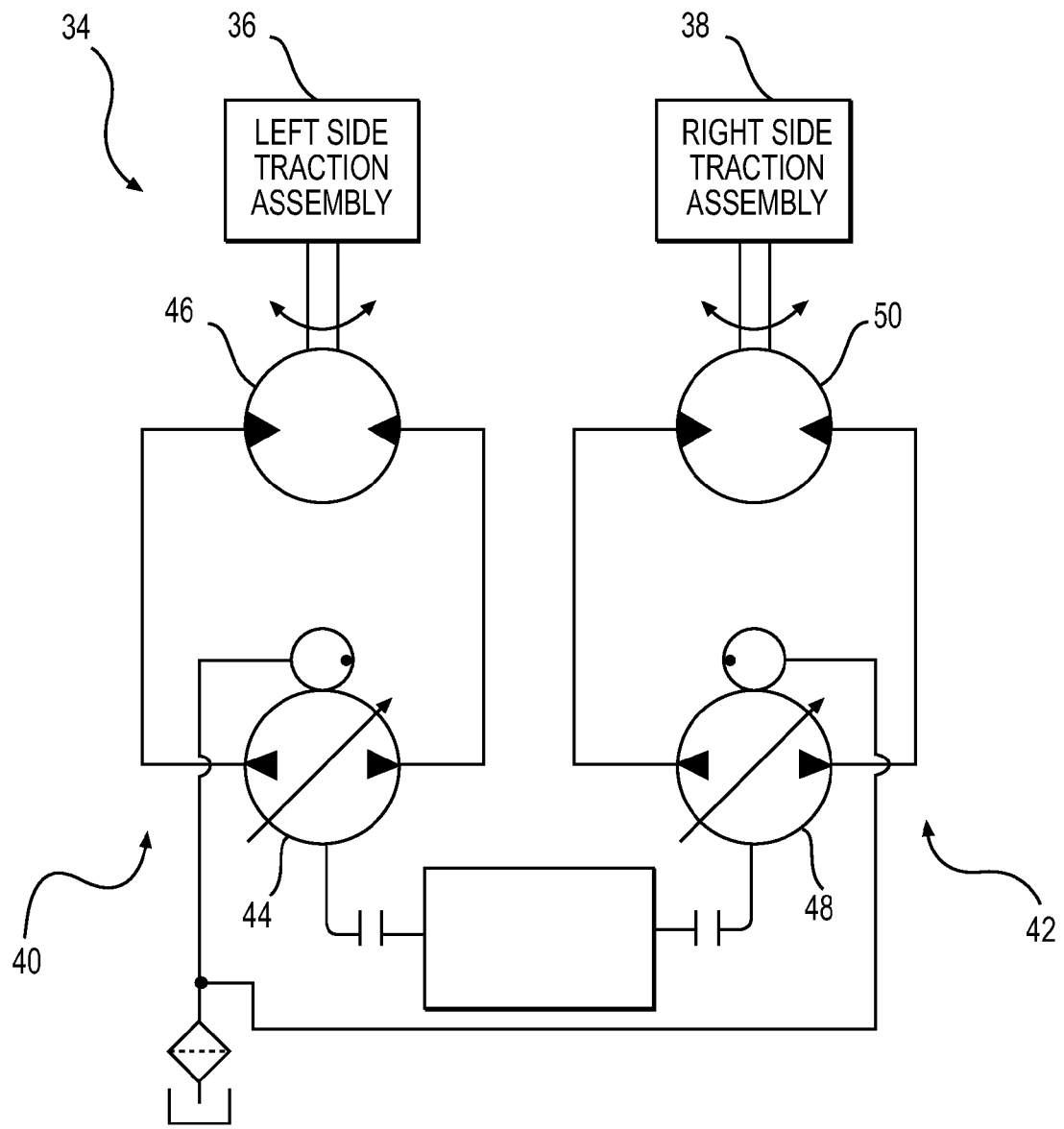
FIG. 3 is a hydraulic diagram according to yet another aspect of the disclosure.

One example of a torque consuming device is a dual path hydrostatic transmission 34, shown in FIG. 3. Transmission components 22 of FIG. 1 may be part of dual path hydrostatic transmission 34. Dual path hydrostatic transmission 34 may operatively couple prime mover 12 to left and right side traction assemblies 36 and 38 of machine 10, which may be similar, in structure and operation, to traction assembly 16. Dual path hydrostatic transmission 34 may include a left side hydrostatic transmission 40 and a right side hydrostatic transmission 42. Left and right side hydrostatic transmissions 40 and 42 may include fluid loops or hydraulic circuits, and may use fluid flow and pressure to transfer power between prime mover 12 and left and right side traction assemblies 36 and 38.

Left side hydrostatic transmission 40 may include a left side pump 44 and a left side motor 46 that may be fluidly coupled. Left side pump 44 may convert rotational motion of prime mover 12 into fluid flow. Left side motor 46 may convert the fluid flow back into rotational motion that may be used to drive left side traction assembly 36. Left side pump 44 and left side motor 46 may be of a fixed displacement type or variable displacement type. By controlling the direction of flow and displacement of left side pump 44 and motor 46, the direction of travel and speed of machine 10 may be controlled. For example, by setting fluid flow in left side pump 44 and motor 46 in the forward direction, and increasing the displacement of left side pump 44 and/or decreasing the displacement of left side motor 46, the speed of left side traction assembly 36 in the forward direction may be increased. By setting fluid flow in left side pump 44 and motor 46 in the reverse direction, and increasing the displacement of left side pump 44 and/or decreasing the displacement of left side motor 46, the speed of left side traction assembly 36 in the reverse direction may be increased. In both the forward and reverse situations described above, decreasing the displacement of left side pump 44 and/or increasing the displacement of left side motor 46 may decrease the speed of left side traction assembly 36.

Right side hydrostatic transmission 42 may include a right side pump 48 and a right side motor 50. Right side hydrostatic transmission 42 may be used to control the speed and direction of right side traction assembly 38 in a manner similar to that described above with respect to left side hydrostatic transmission 40 and left side traction assembly 36.

Machine 10 may also include one or more sensors (not shown). Various sensors may be located throughout machine 10, and may be arranged to provide information related to machine 10. In one embodiment, the sensors may be operable to provide signals indicative of parameters related to prime mover 12, torque consuming devices 52, and/or any other components of machine 10. For example, the sensors may provide signals indicative of operating parameters related to left and right side hydrostatic transmissions 40 and 42, including fluid pressure, fluid temperature, displacement, speed, and/or any other suitable operating parameters. The sensors may also be operable to provide signals indicative of operating parameters related to prime mover 12, including, for example, engine speed.

Machine 10 may also include a control system 54, shown in FIG. 2 among control elements 56. Control system 54 may include request modules 58 corresponding to torque consuming devices 52. Request modules 58 may obtain input signals related to torque consuming devices 52, including, for example, pressures, flow rates, current power usage, and/or expected power usage. The input signals may be in the form of signals generated by one or more electronic devices, such as sensors, monitoring torque consuming devices 52. The signals may also be generated by a machine operator through a control device, such as a joystick, steering wheel, accelerator pedal, or any other suitable control device. Based at least in part on the input signals, request modules 58 may generate requests for torque.

A torque distribution module 60 may obtain a high level torque load limit from a torque load determination module 62, and may also obtain request signals from request modules 58. The high level torque load limit may be indicative of the maximum load that torque consuming devices 52 can exert on prime mover 12 without forcing prime mover 12 to operate outside of a desired operating range. Torque distribution module 60 may use the torque load limit, request signals, and algorithms to allocate or distribute the high level torque load limit between torque consuming devices 52. The allocation or distribution of the torque load limit between torque consuming devices 52 divides the high level torque load limit into intermediate level torque load limits. Each intermediate level torque load limit may correspond to a particular one of torque consuming devices 52, and may be indicative of the maximum load that the particular torque consuming device can apply to prime mover 12 without forcing prime mover 12 to operate outside of its desired operating range.

Torque distribution module 60 may allocate or distribute the high level torque load limit by generating torque limit signals that may be sent to output command modules 64, each of which may correspond to one of torque consuming devices 52. Output command modules 64 may form part of control system 54. Output command modules 64 may trigger the delivery of torque from prime mover 12 to torque consuming devices 52.

Output command modules 64 may also generate operating condition request signals, requesting prime mover 12 to operate at one or more target operating conditions. A power generation control module 66 may obtain the operating condition request signals from output command modules 64. Power generation control module 66 may control or adjust the operating conditions of prime mover 12 based on the operating condition request signals. Power generation control module 66 may do so by generating power generation control request signals that may be sent to a prime mover control module 68. Prime mover control module 68 may control or adjust the operating conditions of prime mover 12 based on the power generation control request signals. The operating conditions of prime mover 12 may be input into torque load determination module 62.

Control system 54 may be in the form of an electronic control module, and may include, for example, components that may be used to run applications, such as, for example, a memory, a secondary storage device, and/or a central processing unit. Control system 54 may be configured to control operation of torque consuming devices 52. For example, control system 54 may be operable to control dual path hydrostatic transmission 34 by supplying control signals for operating left and right side pumps 44 and 48 and motors 46 and 50. In particular, control system 54 may control fluid flow in dual path hydrostatic transmission 34 by, for example, controlling the displacements of left and right side pumps 44 and 48 and motors 46 and 50. Control system 54 may control the displacements to achieve a desired change in state based on signals received from the operator interface in cab 18 and/or the sensors in machine 10. Such signals may be in the form of digital, analog, mechanical, and/or hydraulic signals.

Figure 4:
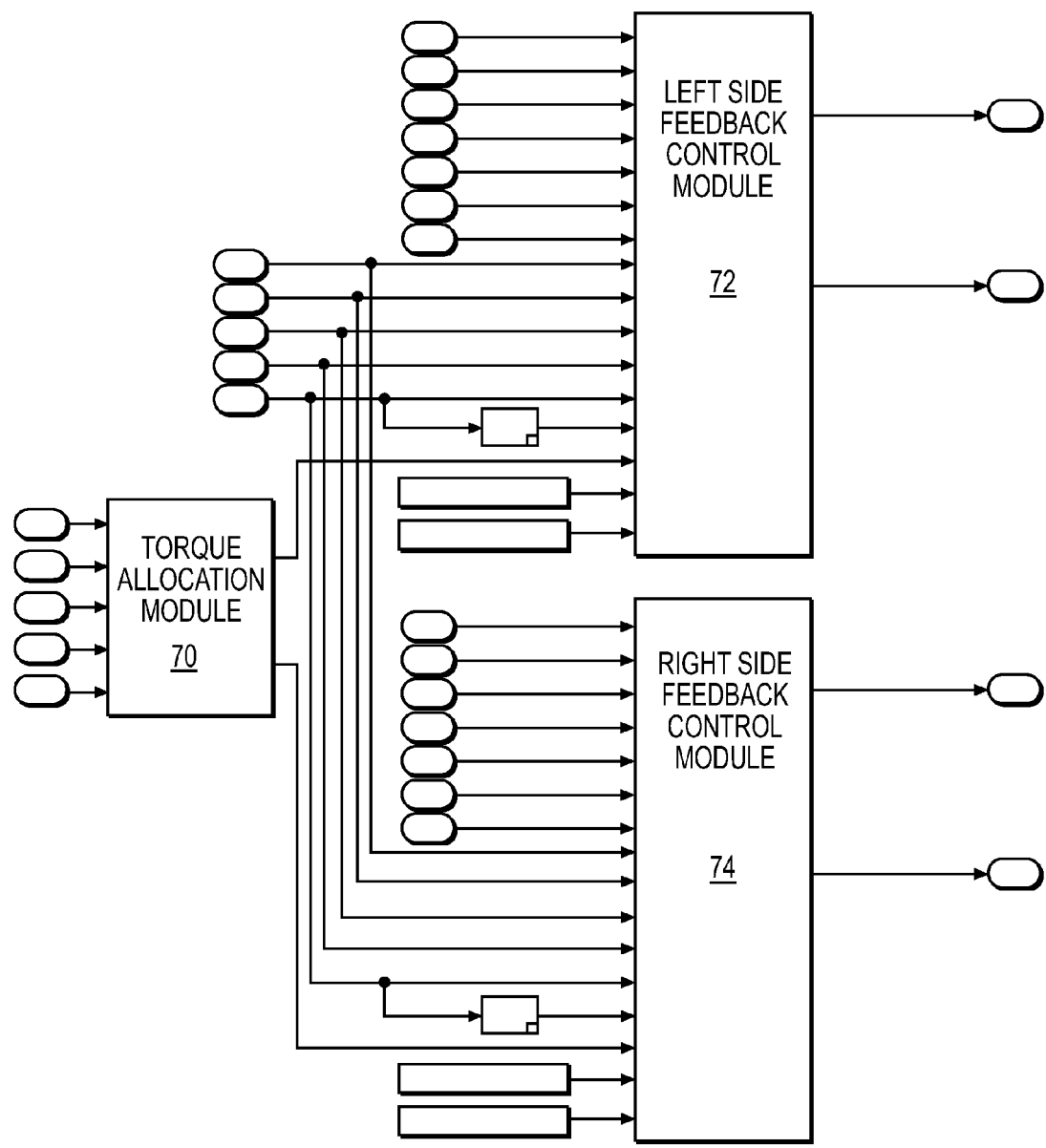
FIG. 4 is a control schematic according to yet another aspect of the disclosure.

A torque consuming device may include one or more torque consuming elements. For example, dual path hydrostatic transmission 34 may include left and right side hydrostatic transmissions 40 and 42. Control system 54 may obtain the intermediate level torque load limit corresponding to dual path hydrostatic transmission 34, and may further allocate or distribute the intermediate level torque load limit in the form of lower level torque load limits to left and right side hydrostatic transmissions 40 and 42. Control system 54 may include a torque allocation module 70 operable to perform the allocation or distribution. Torque allocation module 70 is shown in FIG. 4.

While in the description below, the intermediate level torque load limit may be allocated or distributed as lower level torque load limits for left and right side hydrostatic transmissions 40 and 42 of dual path hydrostatic transmission 40, it should be understood that similar steps and processes may be used with respect to any of torque consuming devices 52. Further, a torque consuming device may include torque consuming elements that may differ from those described, and torque allocation module 70 may allocate or distribute the intermediate level torque load limit among those torque consuming elements. In the case of a torque consuming device having only one torque consuming element, the intermediate level torque load limit need not be allocated or distributed as lower level torque load limits. Rather, the single torque consuming element may receive the entire intermediate level torque load limit. In such a case, control system 54 may bypass torque allocation module 70, or otherwise prevent torque allocation module 70 from splitting the intermediate level torque load limit.

Torque allocation module 70 may obtain the intermediate torque load limit, left and right side estimated pump torques, and left and right side pump torque requests. The estimated pump torques may be calculated based on information from sensors, look-up tables, and/or historical performance data, and may differ from the actual pump torque for left and right side pumps 44 and 48. The pump torque requests may be generated by a machine operator in cab 18 using the operator interface. Torque allocation module 70 may determine lower level torque load limits for left and right side pumps 44 and 48 based at least in part on these inputs. The lower level torque load limits may be indicative of the load the components can exert on prime mover 12 without forcing prime mover 12 to operate outside a desired operating range. Torque allocation module 70 may perform one or more steps to determine the lower level torque load limits. The logic may proceed in a serial fashion. In other words, torque allocation module 70 may enter the first step, and if conditions associated with the first step are satisfied, torque allocation module 70 may execute algorithms associated with the first step. If conditions associated with the first step are not met, torque allocation module 70 may proceed to the second step, and may check whether conditions associated with the second step are satisfied. If so, torque allocation module 70 may execute algorithms associated with the second step. If not, torque allocation module 70 may proceed to the third step, and may check whether conditions associated with the third step are satisfied. If so, torque allocation module 70 may execute algorithms associated with the third step. If not, torque allocation module 70 may proceed to the fourth step. Torque allocation module 70 may check whether conditions associated with the fourth step are satisfied. Alternatively, torque allocation module 70 may automatically recognize that conditions associated with the fourth step are satisfied by the process of elimination. Torque allocation module 70 may then execute algorithms associated with the fourth step. A more detailed explanation of exemplary steps, and algorithms performed at the steps, is provided below. It should be understood that additional, fewer, or different steps may be used to allocate or distribute the intermediate torque load limit, and that the type and or number of steps may depend on the type and/or number of torque consuming devices in a machine, as well as the type and/or number of torque consuming elements in those torque consuming devices.

In the first step, torque allocation module 70 may determine whether the left and right side pump torque requests, when combined, are less than or equal to the intermediate torque load limit. If so, torque allocation module 70 may divide the intermediate torque load limit proportionally between the left and right sides, based on the magnitudes of their respective torque requests, to arrive at the lower level torque load limits for the left and right side pumps 44 and 48. For example, the lower level torque load limits may be determined using the following equations:

$$L_1 = \frac{Z_1}{2} + \frac{(X_1 - Y_1)}{2},$$

and $$R_1 = \frac{Z_1}{2} + \frac{(X_1 - Y_1)}{2}, \text{ where}$$

$L_1$=the lower level torque load limit for left side pump 44,
$R_1$=the lower level torque load limit for right side pump 48;
$X_1$=the left side pump torque request,
$Y_1$=the right side pump torque request, and
$Z_1$=the intermediate torque load limit.

If, on the other hand, the left and right side pump torque requests, when combined, are greater than the intermediate torque load limit, torque allocation module 70 may not perform the acts associated with the first step. Rather, torque allocation module 70 may proceed to step two. In the second step, torque allocation module 70 may determine whether the left side pump torque estimate is greater than or equal to zero, and whether the right side pump torque estimate is greater than or equal to zero. If so, torque allocation module 70 may take steps to reduce the left and right side pump torque requests in proportion to their respective magnitudes so that when the reduced left and right side pump torque requests are added together, their sum is equal to the intermediate torque load limit. The left and right side pump torque requests are thus scaled down to fit within the threshold set by the intermediate torque load limit. The lower level torque load limit for left side pump 44 may be equal to the reduced left side pump torque request, and the lower level torque load limit for the right side pump 48 may be equal to the reduced right side pump torque request. For example, the lower level torque load limits may be determined using the following equations:

$$L_2 = \frac{(X_2 \times Z_2)}{(X_2 + Y_2)},$$

and $$R_2 = \frac{(Y_2 \times Z_2)}{(X_2 + Y_2)}, \text{ where}$$

$L_2$=lower level torque load limit for left side pump 44,
$R_2$=lower level torque load limit for right side pump 48,
$X_2$=the left side pump torque request,
$Y_2$=the right side pump torque request, and
$Z_2$=the intermediate torque load limit.

If either of the left and right side pump torque estimates is less than zero, torque allocation module 70 may not perform the acts associated with the second step, but rather, may proceed to the third step. In the third step, torque allocation module 70 may determine whether the left side pump torque estimate is greater than or equal to zero, and whether the right side pump torque estimate is less than zero. If so, torque allocation module 70 may recognize that machine 10 may be performing a right turn. As machine 10 performs the right turn, the ground may push back on right, side traction assembly 38, causing right side pump 48 to have a negative pump torque. This overrunning condition may allow right side pump 48 to supply, rather than consume, pump torque. Torque allocation module 70 may use algorithms that take into account torque harnessed from right side pump 48. Thus, left side pump 44 may receive more torque than would normally be allowed based solely on the intermediate torque load limit. For example, the lower level torque load limits may be determined using the following equations:

$$L_3 = Z_3 - X_3, \text{ and}$$

$$R_3 = Y_3, \text{ where}$$

$L_3$=the lower level torque load limit for left side pump 44,
$R_3$=the lower level torque load limit for right side pump 48,
$X_3$=the right side pump torque estimate,
$Y_3$=the right side pump torque request, and
$Z_3$=the intermediate torque load limit.

If the conditions for performance of the first, second, and third steps are not present, torque allocation module 70 may recognize that the left side pump torque estimate is less than zero, and the right side pump torque estimate is greater than or equal to zero. This scenario corresponds to the fourth step. If the right side pump torque estimate is greater than or equal to zero, and the left side pump torque estimate is less than or equal to zero, torque allocation module 70 may recognize that machine 10 may be performing a left turn. As machine 10 performs the left turn, the ground may push back on left side traction assembly 36, causing left side pump 44 to have a negative pump torque. This overrunning condition may allow left side pump 44 to supply, rather than consume, pump torque. Torque allocation module 70 may use algorithms that take into account torque harnessed from left side pump 44. Thus, right side pump 48 may receive more torque than would normally be allowed based solely on the intermediate torque load limit. For example, the lower level torque load limits may be determined using the following equations:

$$L_4 = X_4, \text{ and}$$

$$R_4 = Z_4 - Y_4, \text{ where}$$

$L_4$=lower level torque load limit for left side pump 44,
$R_4$=lower level torque load limit for right side pump 48,
$X_4$=the left side pump torque request,
$Y_4$=the left side pump torque estimate, and
$Z_4$=the intermediate torque load limit.

Once the lower level torque load limits for left and right side pumps 44 and 48 have been determined, they may be input into left and right side feedback control modules 72 and 74, respectively. The left side feedback control module 72 may be operable to determine left side pump and motor displacement commands, while the right side feedback control module 74 may be operable to determine right side pump and motor displacement commands. The pump and motor displacement commands may be used to control left and right side hydrostatic transmissions 40 and 42, and/or may be used in downstream algorithms.

Figure 5:
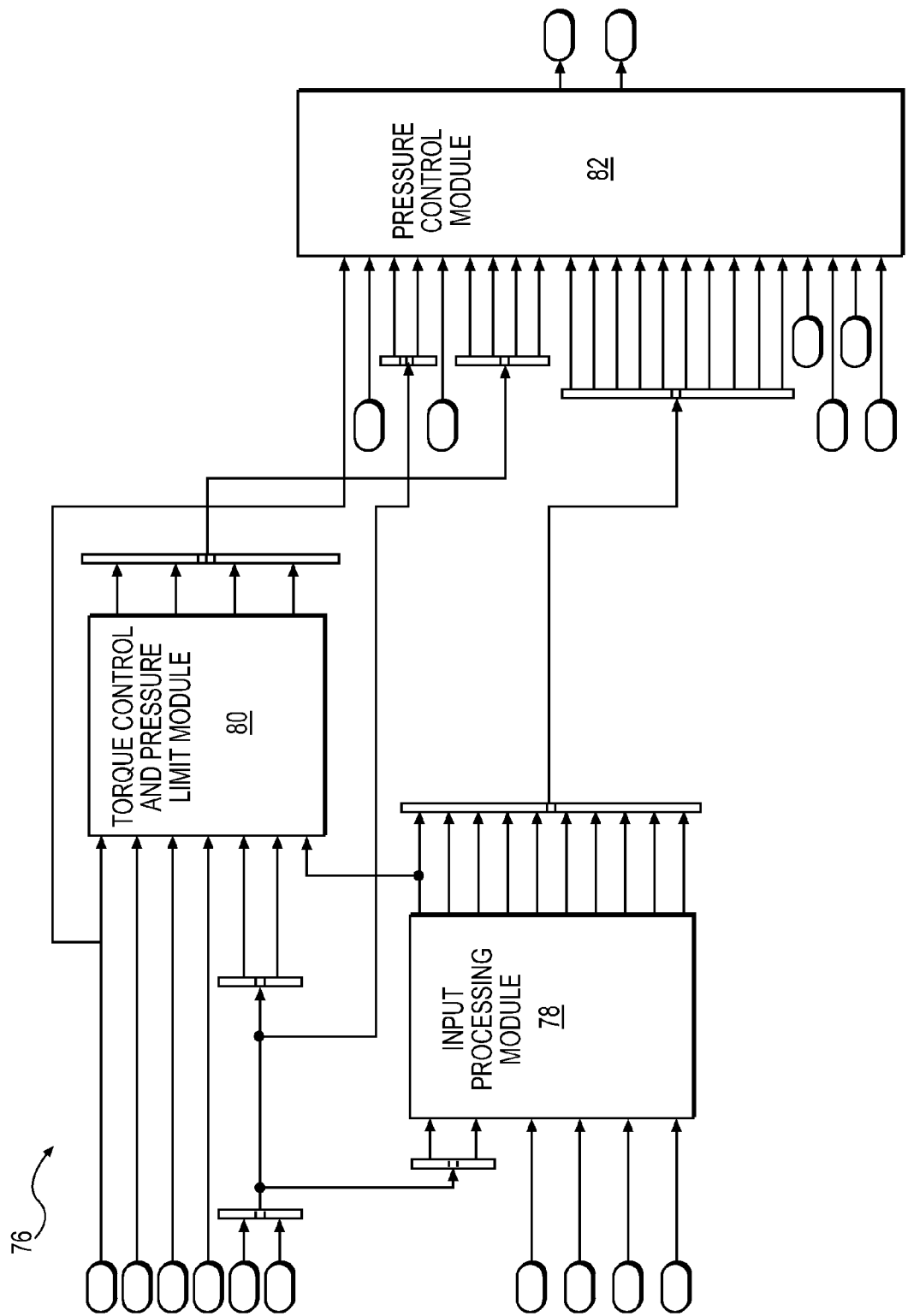
FIG. 5 is a control schematic according to yet another aspect of the disclosure.

A feedback control module 76, shown in FIG. 5, will be discussed below. The description of feedback control module 76 may be applicable to both left and right side feedback control modules 72 and 74 of FIG. 4. However, it should be understood that right side feedback control module 74 may receive right side related input signals for determining right side related output signals (e.g., input and output signals corresponding to right side hydrostatic transmission 42), while left side feedback control module 72 may receive left side related input signals for determining left side related output signals (e.g., input and output signals corresponding to left side hydrostatic transmission 40). In the case of a torque consuming device that includes only one torque consuming element, only a single feedback control module may be required.

Feedback control module 76 may include an input processing module 78 operable to take filtered derivatives of input signals. For hydrostatic transmissions, such as left and right side hydrostatic transmissions 40 and 42, the input signals may include, for example, forward and reverse pressures, estimated pump and motor displacements, and pump and motor speeds. The derivatives may provide indications of the rates of change associated with each of the above-listed input signals.

Feedback control module 76 may also include a torque control and pressure limit module 80 operable to determine torque control and pressure limits, including forward and reverse pressure limits, as well as their derivatives.

During an initial step in this process, torque control and pressure limit module 80 may obtain input signals, such as the lower level torque load limit, pump torque loss, forward and reverse pressures, and estimated displacements. From these input signals torque control and pressure limit module 80 may determine initial forward and reverse pressure limits. For example, the pressure limits may be determined using the following equations:

$$P_{lim,f} = \frac{(T_{lim} - T_{loss})}{D_p} + P_r,$$

and $$P_{lim,r} = P_f - \frac{(T_{lim} - T_{loss})}{D_p}, \text{ where}$$

$P_{lim,f}$=the initial forward pressure limit, $P_{lim,r}$=the initial reverse pressure limit, $T_{lim}$=the lower level torque load limit, $D_p$=the pump displacement, $P_f$=the forward pressure, $P_r$=the reverse pressure, and $T_{loss}$=the pump torque loss.

Torque control and pressure limit module 80 may take a minimum of the initial forward pressure limit, an ePOR setting indicative of a threshold pressure level, and an auxiliary pressure limit indicative of another threshold pressure level. The minimum may be the forward pressure limit. Torque control and pressure limit module 80 may also take a minimum of the initial reverse pressure limit, ePOR setting, and auxiliary pressure limit. The minimum there may be the reverse pressure limit. Torque control and pressure limit module 80 may then take filtered derivatives of the forward and reverse pressure limits, thus obtaining their rates of change.

Figure 6:
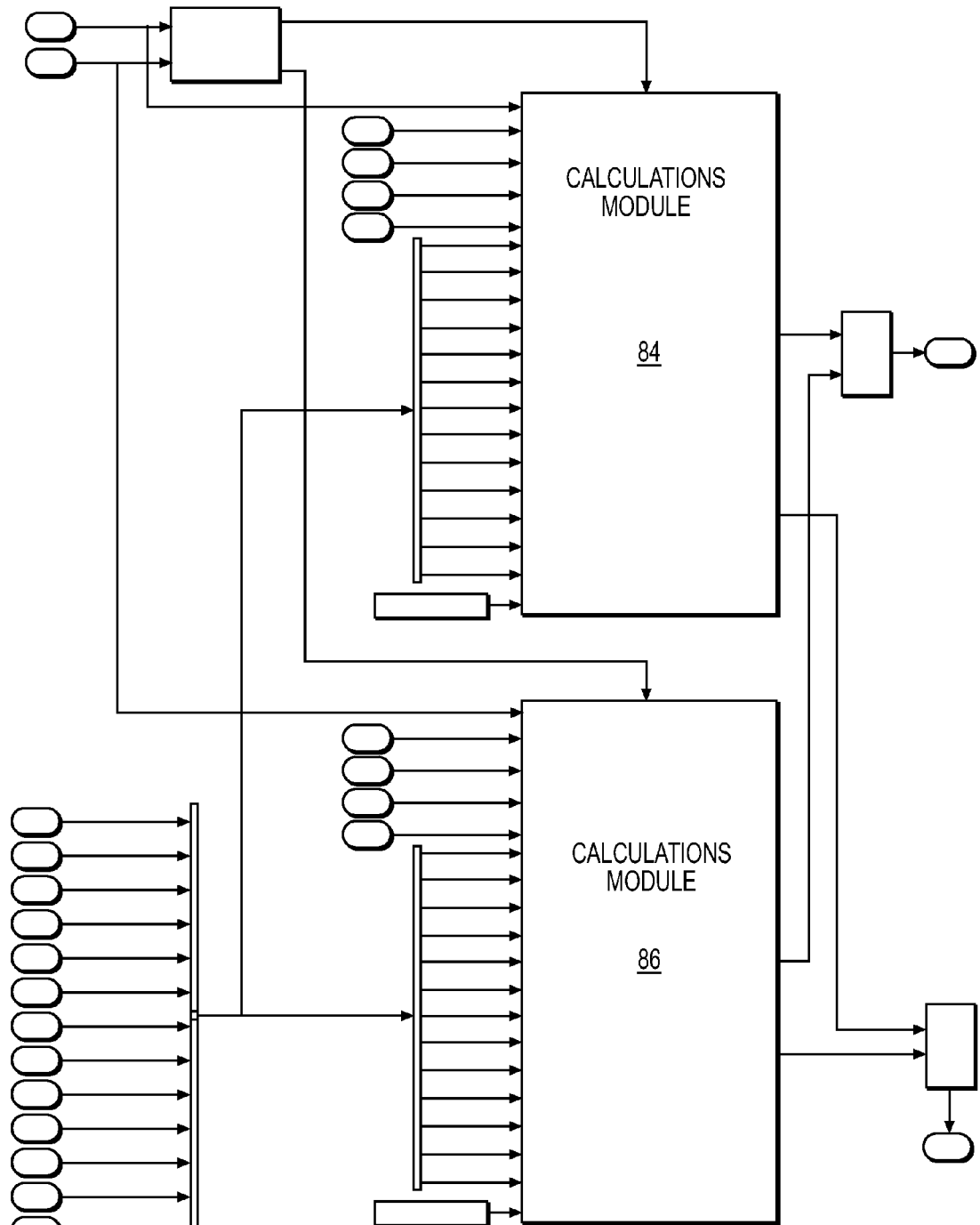
FIG. 6 is a control schematic according to yet another aspect of the disclosure.
Figure 7:
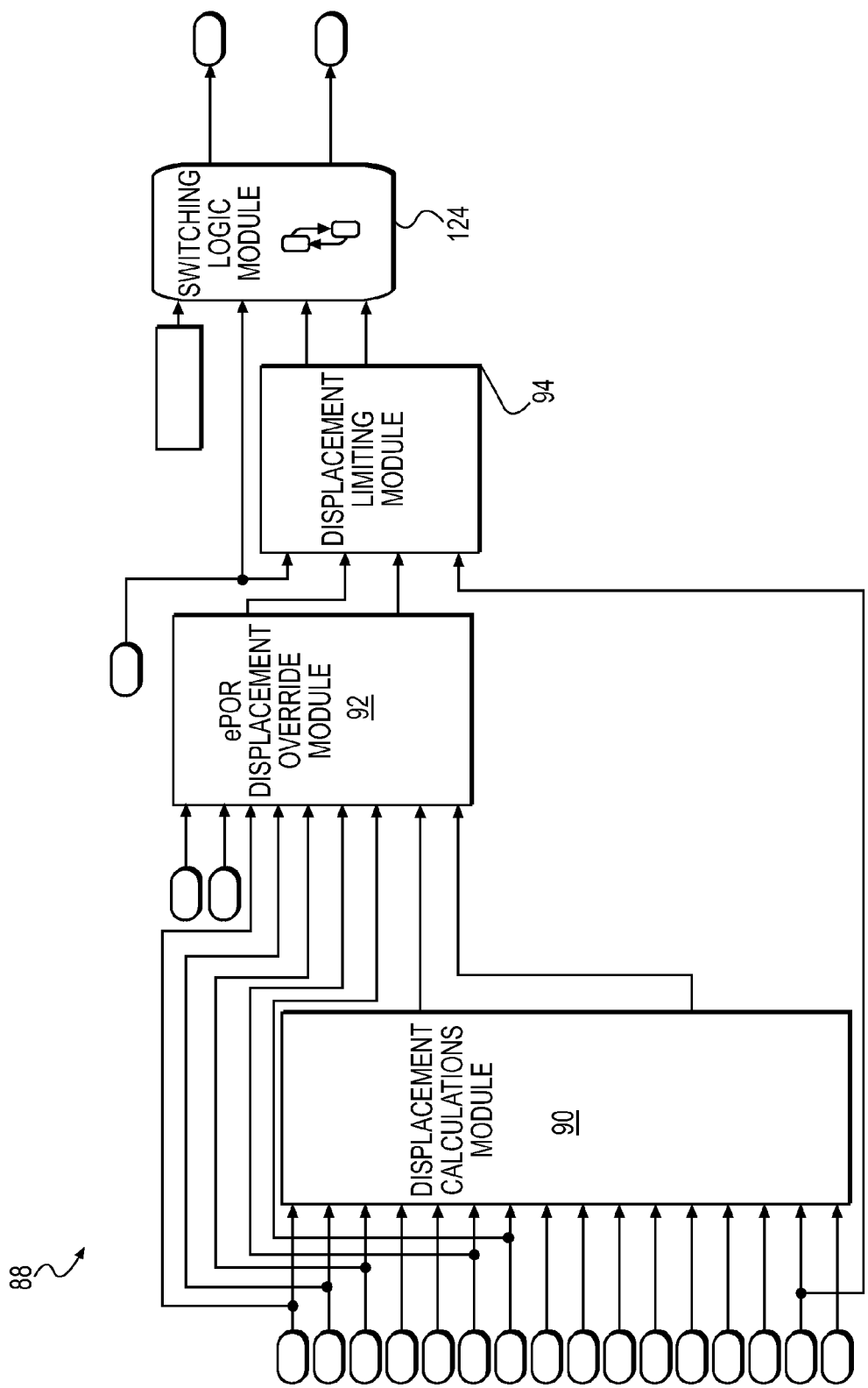
FIG. 7 is a control schematic according to yet another aspect of the disclosure.

Feedback control module 76 may also include a pressure control module 82. Pressure control module 82 may include one or more calculations modules, including, for example, calculations modules 84 and 86, shown in FIG. 6. Calculations module 84 may perform calculations on input signals under one set of conditions. For example, calculations module 84 may perform calculations on input signals when forward pressure exceeds reverse pressure. Under another set of conditions, such as where forward pressure is less than or equal to reverse pressure, calculations module 86 may perform calculations on input signals. A calculations module 88, shown in FIG. 7, will be described below. Calculations modules 84 and 86 may be similar to calculations module 88.

Calculations module 88 may include a displacement calculations module 90 operable to obtain input signals that may be used to determine commanded pump and motor displacements. The input signals may include, for example, signals indicative of a pump displacement, a filtered derivative of the pump displacement, a motor displacement, a filtered derivative of the motor displacement, a high forward pressure error, a filtered derivative of the high forward pressure error, a pump speed, the filtered derivative of the pump speed, a motor speed, the filtered derivative of the motor speed, a fluid bulk modulus, a forward loop volume, a pump displacement response gain, a motor displacement response gain, a proportional error gain, and a derivative error gain. Displacement calculations module 90 may use these input signals to determine commanded pump and motor displacements.

If calculations module 88 is used to perform operations associated with calculations module 84, the high pressure will be a high forward pressure, and the loop volume will be a forward loop volume. In such a case, the commanded pump and motor displacements may be determined using the following equations:

$$D_{p,cmd,f} = D_p + \frac{\left\{\begin{array}{c} k_1 e_{pf} + k_2 \dot{e}_{pf} + \\ (-D_p \dot{\omega}_p + \dot{D}_m \omega_m + D_m \dot{\omega}_m)\frac{\beta}{V_f} \end{array}\right\}}{\alpha_p \omega_p \left(\frac{\beta}{V_f}\right)},$$

and $$D_{m,cmd,f} = D_m + \frac{\left\{\begin{array}{c} -k_1 e_{pf} - k_2 \dot{e}_{pf} + \\ (D_p \dot{\omega}_p + \dot{D}_p \omega_p - D_m \dot{\omega}_m)\frac{\beta}{V_f} \end{array}\right\}}{\alpha_m \omega_m \left(\frac{\beta}{V_f}\right)}, \text{ where}$$

$D_{p,cmd,f}$=commanded pump displacement with high forward pressure, $D_{m,cmd,f}$=commanded motor displacement with high forward pressure, $D_p$=the pump displacement, $\dot{D}_p$=the filtered derivative of the pump displacement, $D_m$=the motor displacement, $\dot{D}_m$=the filtered derivative of the motor displacement, $e_{pf}$=the high forward pressure error, $\dot{e}_{pf}$=a filtered derivative of the high forward pressure error, $\omega_p$=the pump speed, $\dot{\omega}_p$=the filtered derivative of pump speed, $\omega_m$=the motor speed, $\dot{\omega}_m$=the filtered derivative of motor speed, $\beta$=the fluid bulk modulus, $V_f$=the forward loop volume, $\alpha_p$=the pump displacement response gain, $\alpha_m$=the motor displacement response gain, $k_1$=a proportional error gain, and $k_2$=a derivative error gain.

The following equations may also apply:

$$e_{pf} = P_{lim,f} - P_f, \text{ and}$$

$$\dot{e}_{pf} = \dot{P}_{lim,f} - \dot{P}_f, \text{ where}$$

$P_{lim,f}$=the forward loop pressure limit from torque control and pressure limit module 80, $P_f$=a forward loop pressure, $\dot{P}_{lim,f}$=a filtered derivative of the forward loop pressure limit, and $\dot{P}_f$=a filtered derivative of the forward loop pressure.

If, on the other hand, calculations module 88 is used to perform operations associated with calculations module 86, the high pressure will be a high reverse pressure, and the loop volume will be a reverse loop volume. In such a case, the commanded pump and motor displacements may be determined using the following equations:

$$D_{p,cmd,r} = D_p + \frac{\left\{\begin{array}{c} -k_1 e_{pr} - k_2 \dot{e}_{pr} + \\ (-D_p \dot{\omega}_p + \dot{D}_m \omega_m + D_m \dot{\omega}_m)\frac{\beta}{V_r} \end{array}\right\}}{\alpha_p \omega_p \left(\frac{\beta}{V_r}\right)},$$

and

-continued $$D_{m,cmd,r} = D_m + \frac{\left\{\begin{array}{l} k_1 e_{pr} + k_2 \dot{e}_{pr} + \\ (D_p \dot{\omega}_p + \dot{D}_p \omega_p - D_m \dot{\omega}_m)\frac{\beta}{V_r} \end{array}\right\}}{\alpha_m \omega_m \left(\frac{\beta}{V_r}\right)}, \text{ where}$$

$D_{p,cmd,r}$=commanded pump displacement with high reverse pressure,
$D_{m,cmd,r}$=commanded motor displacement with high reverse pressure,
$D_p$=the pump displacement,
$\dot{D}_p$=the filtered derivative of the pump displacement,
$D_m$=the motor displacement,
$\dot{D}_m$=the filtered derivative of the motor displacement,
$e_{pr}$=the high reverse pressure error,
$\dot{e}_{pr}$=a filtered derivative of the high reverse pressure error,
$\omega_p$=the pump speed,
$\dot{\omega}_p$=the filtered derivative of pump speed,
$\omega_m$=the motor speed,
$\dot{\omega}_m$=the filtered derivative of motor speed,
$\beta$=the fluid bulk modulus,
$V_r$=the reverse loop volume,
$\alpha_p$=the pump displacement response gain,
$\alpha_m$=the motor displacement response gain,
$k_1$=a proportional error gain, and
$k_2$=a derivative error gain.
The following equations may also apply:

$$e_{pr} = P_{lim,r} - P_r, \text{ and}$$

$$\dot{e}_{pr} = \dot{P}_{lim,r} - \dot{P}_r, \text{ where}$$

$P_{lim,r}$=the reverse loop pressure limit from torque control and pressure limit module 80,
$P_r$=a reverse loop pressure,
$\dot{P}_{lim,r}$=a filtered derivative of the reverse loop pressure limit, and
$\dot{P}_r$=a filtered derivative of the reverse loop pressure.

Once determined, the commanded pump and motor displacements may be used to control the pumps and motors in a torque consuming device, such as left and right side pumps 44 and 48 and motors 46 and 50 of dual path hydrostatic transmission 34. Additionally or alternatively, the determined pump and motor displacements may be used by control system 54 as inputs for downstream algorithms and applications.

The downstream algorithms and applications may be operable to adjust the determined pump and motor displacements to take into account other limitations associated with machine 10. For example, torque consuming devices 52 of machine 10 may be damaged if they are subjected to excessive pressure levels. As such, a torque consuming device, such as dual path hydrostatic transmission 34, may include a relief mechanism for relieving pressure from dual path hydrostatic transmission 34 once it reaches a predetermined level. That predetermined level will be referred to here as the cross over relief ("COR") setting. Dual path hydrostatic transmission 34 may still be susceptible to damage if it is at the COR setting for an extended period of time. Thus, it may be desirable to reduce the time dual path hydrostatic transmission 34 spends at the COR setting.

One way to achieve this may be by overriding the outputs from displacement calculations module 90, under a set of conditions, to keep pressure levels below the COR setting. The process of determining when to override may include the step of establishing an electronic pressure override ("ePOR") setting. The ePOR setting may be below the COR setting by about 3,000 kPa. Hysteresis may be used to determine when the commanded pump and motor displacements from displacement calculations module 90 should be overridden. For example, it may be desirable to override the commanded pump and motor displacements from displacement calculations module 90 when pressure levels reach an upper threshold. The difference between the upper threshold and the ePOR setting is referred to here as the upper delta. It may also be desirable to discontinue overriding the commanded pump and motor displacements from displacement calculations module 90 when pressure levels fall to a lower threshold. The difference between the lower threshold and the ePOR setting is referred to here as the lower delta. In one embodiment, the upper threshold may be about 2,000 kPa above the ePOR set point, and the lower threshold may be about 1,000 kPa above the ePOR set point.

The upper and lower deltas may be input into an ePOR displacement override module 92 of calculations module 88 along with other input signals, including, for example, signals indicative of the commanded pump and motor displacements (from displacement calculations module 90), the pressure, the ePOR setting, and leakage at the ePOR setting. The displacement override pump and motor displacements may be determined using the following equations:

$$D_{p,ePOR,ov} = \frac{Q_{leakage,ePOR} \times S + D_m \omega_m}{\omega_p},$$

and $$D_{m,ePOR,ov} = \frac{-Q_{leakage,ePOR} \times S + D_p \omega_p}{\omega_m}, \text{ where}$$

$D_{p,ePOR,ov}$=the displacement override pump displacement,
$D_{m,ePOR,ov}$=the displacement override motor displacement,
$Q_{leakage,ePOR}$=the leakage with high pressure at the ePOR setting,
S=a sign (positive for forward pump displacement, and negative for reverse pump displacement),
$D_p$=pump displacement,
$D_m$=motor displacement,
$\omega_m$=motor speed, and
$\omega_p$=pump speed.

ePOR displacement override module 92 may operate in an initial pump state upon receiving the commanded pump displacement from displacement calculations module 90. In the initial pump state, ePOR displacement override module 92 may not override the commanded pump displacement. As such, the output from ePOR displacement override module 92 may be the commanded pump displacement. If, however, ePOR displacement override module 92 determines that the pressure is greater than the sum of the ePOR setting and the upper delta, and the absolute value of the commanded pump displacement is greater than the absolute value of the displacement override pump displacement, ePOR displacement override module 92 may shift to an override pump state. In the override pump state, the output from ePOR displacement override module 92 may be the displacement override pump displacement.

ePOR displacement override module 92 may remain in the override pump state until the pressure falls below the sum of the ePOR setting and the lower delta, or the absolute value of the commanded pump displacement is less than the absolute value of the displacement override pump displacement. When either of those conditions is true, ePOR displacement override module 92 may return to its initial pump state. Using this logic, ePOR displacement override module 92 may quickly change the pump displacement so that it may be close to the value needed to keep pressure levels below the COR setting.

ePOR displacement override module 92 may operate in an initial motor state upon receiving the commanded motor displacement from displacement calculations module 90. In the initial motor state, ePOR displacement override module 92 may not override the commanded motor displacement. As such, the output from ePOR displacement override module 92 may be the commanded motor displacement. If, however, ePOR displacement override module 92 determines that the pressure is greater than the sum of the ePOR setting and the upper delta, and the commanded motor displacement is less than the displacement override motor displacement, ePOR displacement override module 92 may shift to an override motor state. In the override motor state, the output from ePOR displacement override module 92 may be the displacement override motor displacement.

ePOR displacement override module 92 may remain in the override motor state until the pressure falls below the sum of the ePOR setting and the lower delta, or the commanded motor displacement is greater than the displacement override motor displacement. When either of those conditions is true, ePOR displacement override module 92 may return to its initial motor state. Using this logic, ePOR displacement override module 92 may quickly change the motor displacement so that it may be close to the value needed to keep pressure levels below the COR setting.

Calculations module 88 may also include a displacement limiting module 94. Displacement limiting module 94 may obtain, as input signals, the output signals of ePOR displacement override module 92. Displacement limiting module 94 may also obtain other input signals, including, for example, a signal indicative of a requested displacement ratio. Displacement limiting module 94 may determine if the obtained pump and motor displacements are excessive, and if so, may limit them.

One reason that pump and motor displacements may require limiting arises from how those pump and motor displacements are determined. Control system 54, by using the algorithms of displacement calculations module 90 and ePOR displacement override module 92 to determine pump and motor displacements, may seek to reduce pressure error to enhance machine performance. Pressure error is the difference between a pressure limit (e.g., the forward and reverse pressure limits from torque control and pressure limit module 80) and measured pressure (e.g., measured pressure in a torque consuming device, such as dual path hydrostatic transmission 34). Using left side hydrostatic transmission 40 as an example, increasing the displacement of left side pump 44 may bring a measured pressure in left side hydrostatic transmission 40 closer to a pressure limit for left side hydrostatic transmission 40, thus reducing pressure error. However, if the pump displacement exceeds a requested pump displacement, left side hydrostatic transmission 40 may operate at a speed faster than that requested, which may make it difficult to operate machine 10 with precision.

Figure 8:
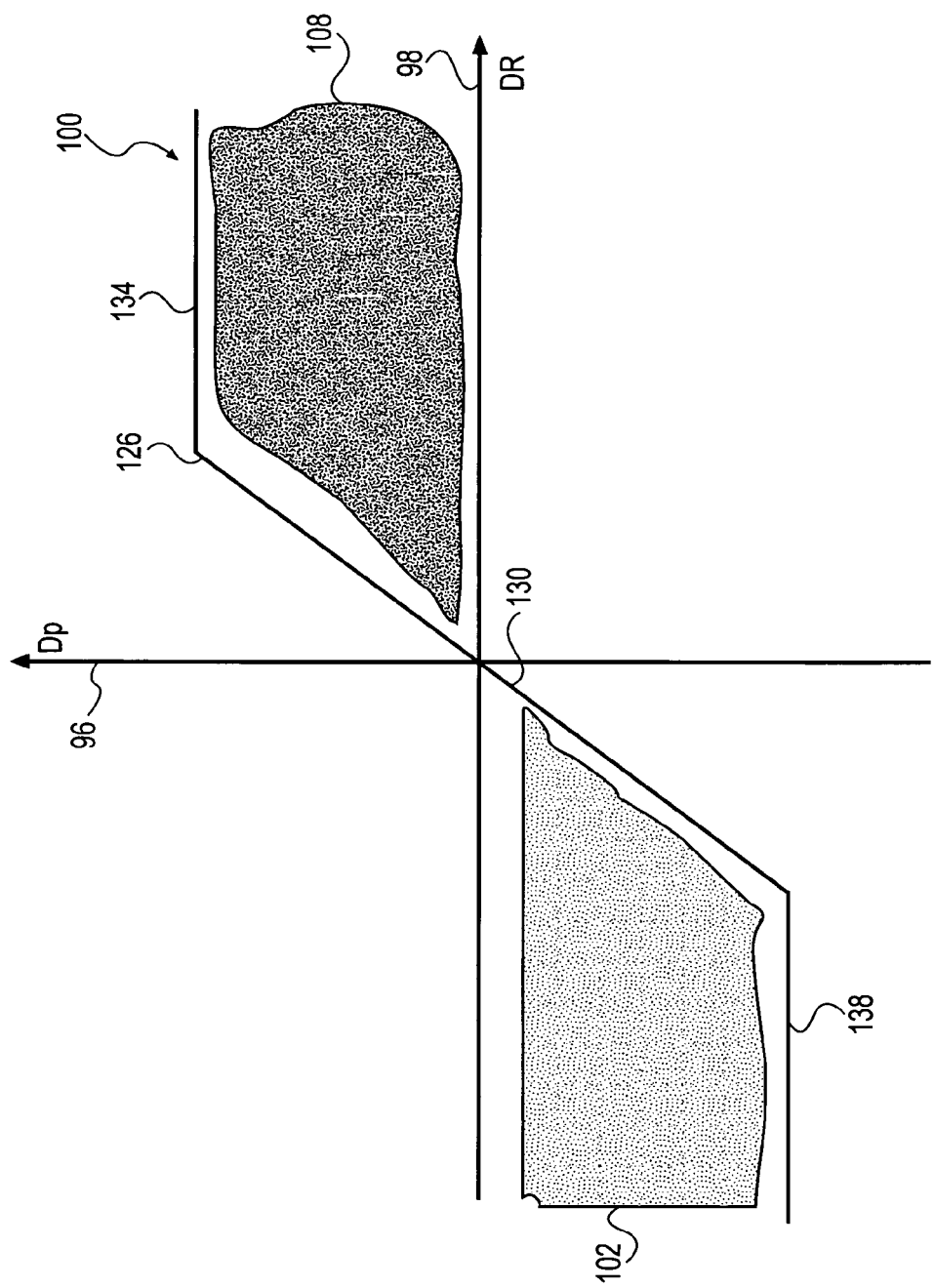
FIG. 8 is a graph according to yet another aspect of the disclosure.

Displacement limiting module 94 may be operable to help prevent the pump displacement from reaching excessively high levels by setting limits on the pump displacement. FIG. 8 shows a graph that represents the ranges of allowable pump displacement. A pump displacement axis 96 may represent pump displacements, while an displacement ratio axis 98 may represent requested displacement ratios (i.e., requested pump displacements divided by requested motor displacements). A curve 100 may be indicative of pump displacements at various requested displacement ratios. Two regions 102 and 108, may be formed, representing regions of allowed pump displacement.

If a first pump condition exists, corresponding to a requested displacement ratio greater than zero, region 108 and portions 126 and 134 of curve 100 may represent the allowed pump displacements. Thus, if there is a high forward pressure in the pump, and an input signal indicative of the pump displacement from displacement calculations module 90 or ePOR displacement override module 92 is in region 108 at the positive requested displacement ratio, displacement limiting module 94 may not limit the input signal. However, if under similar conditions the input signal is not in region 108, displacement limiting module 94 may limit the input signal to a pump displacement on portions 126 and 134.

If there is a high reverse pressure in the pump, and an input signal indicative of the pump displacement from displacement calculations module 90 or ePOR displacement override module 92 is on portions 126 and 134 at the positive requested displacement ratio, displacement limiting module 94 may not limit the input signal. However, if under similar conditions the input signal is not on portions 126 and 134, displacement limiting module 94 may limit the input signal to a pump displacement on portions 126 and 134.

If a second pump condition exists, corresponding to a requested displacement ratio less than zero, region 102 and portions 130 and 138 of curve 100 may represent the allowed pump displacements. Thus, if there is a high forward pressure in the pump, and an input signal indicative of the pump displacement from displacement calculations module 90 or ePOR displacement override module 92 is on portions 130 and 138 at the negative requested displacement ratio, displacement limiting module 94 may not limit the input signal. However, if under similar conditions the input signal is not on portions 130 and 138, displacement limiting module 94 may limit the input signal to a pump displacement on portions 130 and 138.

If there is a high reverse pressure in the pump, and an input signal indicative of the pump displacement from displacement calculations module 90 or ePOR displacement override module 92 is in region 102 at the negative requested displacement ratio, displacement limiting module 94 may not limit the input signal. However, if under similar conditions the input signal is not in region 102, displacement limiting module 94 may limit the input signal to a pump displacement on portions 130 and 138.

Figure 9:
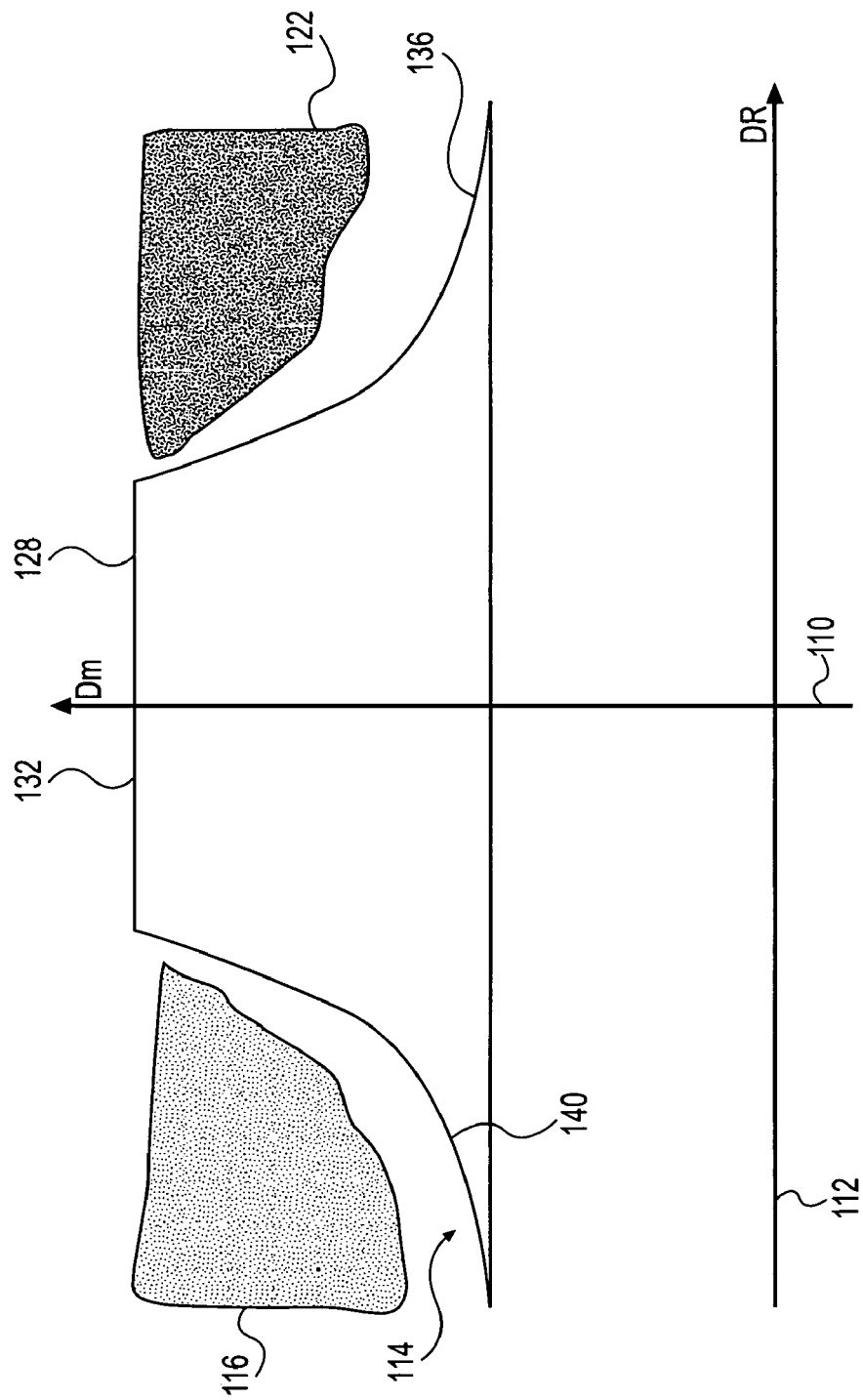
FIG. 9 is a graph according to yet another aspect of the disclosure.

Reducing pressure error by decreasing the displacement of a motor may also be problematic. Thus, displacement limiting module 94 may be operable to help prevent the motor displacement from reaching excessively low levels. FIG. 9 shows the ranges of allowable motor displacement. A motor displacement axis 110 may represent motor displacements, while an displacement ratio axis 112 may represent requested displacement ratios (i.e., requested pump displacements divided by requested motor displacements). A curve 114 may be indicative of motor displacements limits at various requested displacement ratios. Two regions 116 and 122 may be formed, representing regions of allowed motor displacement.

If a first motor condition exists, corresponding to a requested displacement ratio greater than zero, region 122 and portions 128 and 136 of curve 114 may represent the allowed motor displacements. Thus, if there is a high forward pressure in the motor, and an input signal indicative of the motor displacement from displacement calculations module 90 or ePOR displacement override module 92 is in region 122 at the positive requested displacement ratio, displacement limiting module 94 may not limit the input signal. However, if under similar conditions the input signal is not in region 122, displacement limiting module 94 may limit the input signal to a motor displacement on portions 128 and 136.

If there is a high reverse pressure in the motor, and an input signal indicative of the motor displacement from displacement calculations module 90 or ePOR displacement override module 92 is on portions 128 and 136 at the positive requested displacement ratio, displacement limiting module 94 may not limit the input signal. However, if under similar conditions the input signal is not on portions 128 and 136, displacement limiting module 94 may limit the input signal to a motor displacement on portions 128 and 136.

If a second motor condition exists, corresponding to a requested displacement ratio less than zero, region 116 and portions 132 and 140 of curve 114 may represent allowed motor displacements. Thus, if there is a high forward pressure in the motor, and an input signal indicative of the motor displacement from displacement calculations module 90 or ePOR displacement override module 92 is on portions 132 and 140 at the negative requested displacement ratio, displacement limiting module 94 may not limit the input signal. However, if under similar conditions the input signal is not on portions 132 and 140, displacement limiting module 94 may limit the input signal to a motor displacement on portions 132 and 140.

If there is a high reverse pressure in the motor, and an input signal indicative of the motor displacement from displacement calculations module 90 or ePOR displacement override module 92 is in region 116 at the negative requested displacement ratio, displacement limiting module 94 may not limit the input signal. However, if under similar conditions the input signal is not in region 116, displacement limiting module 94 may limit the input signal to a motor displacement on portions 132 and 140.

The above description of the operation of displacement limiting module 94, and its effect on pump and motor displacements, may be applicable to any torque consuming devices that include at least one pump and at least one motor.

Calculations module 88 may include a switching logic module 124 operable to obtain the output signals from displacement limiting module 94. Switching logic module 124 may also obtain other input signals, including, for example, signals indicative of requested displacement ratios and maximum displacements. Using these input signals, switching logic module 124 may select one of a pump state and a motor state, each of the states having associated with it a commanded pump displacement and a command motor displacement. The commanded pump and motor displacements from the selected state may be set as the outputs from switching logic module 124. Switching logic module 124 may switch its selection as conditions change, and thus, the output of switching logic module 124 may also change.

When a torque consuming device or element that has a pump and a motor, such as left or right side hydrostatic transmissions 40 or 42, is in the pump state, motor displacement may be at a maximum. A motor's maximum displacement may be determined based on its rated capacity, look-up tables, and/or historical performance data. With motor displacement at maximum, operation of the torque consuming device may be adjusted by adjusting the displacement of the pump. Allowable pump displacements are shown in FIG. 8. While in the pump state, switching logic module 124 may use the pump displacement from commanded pump displacement limiting module 94 as the setting for the commanded pump displacement.

Switching logic module 124 may transition from the pump state to the motor state when the following three conditions exist: the motor displacement requested by the machine operator is less than the maximum motor displacement, the absolute value of the pump displacement from displacement limiting module 94 is equal to a maximum pump displacement (determined, for example, based on a pump's rated capacity, look-up tables, and/or historical performance data), and the motor displacement from displacement limiting module 94 is less than the maximum motor displacement.

When that torque consuming device or element is in the motor state, pump displacement may be at maximum. With pump displacement at maximum, operation of the torque consuming device may be adjusted by adjusting the displacement of the motor. Allowable motor displacements are shown in FIG. 9. While in the motor state, switching logic module 124 may use the motor displacement from displacement limiting module 94 as the setting for the commanded motor displacement.

Switching logic module 124 may transition from the motor state to the pump state when the following conditions exist: the absolute value of the pump displacement from displacement limiting module 94 is less than the maximum pump displacement, and the motor displacement from displacement limiting module 94 is equal to the maximum motor displacement.

The outputs of switching logic module 124 may be used to control dual path hydrostatic transmission 34. For example, the outputs of switching logic module 124 may be part of the outputs from output command modules 64 that are received by torque consuming devices 52 (as shown in FIG. 2). The outputs may also be obtained by power generation control module 66 for use in controlling the operation of prime mover 12. It should be understood that the steps and processes described above may be used to control any suitable torque consuming device in the same or a similar manner.

Figure 10:
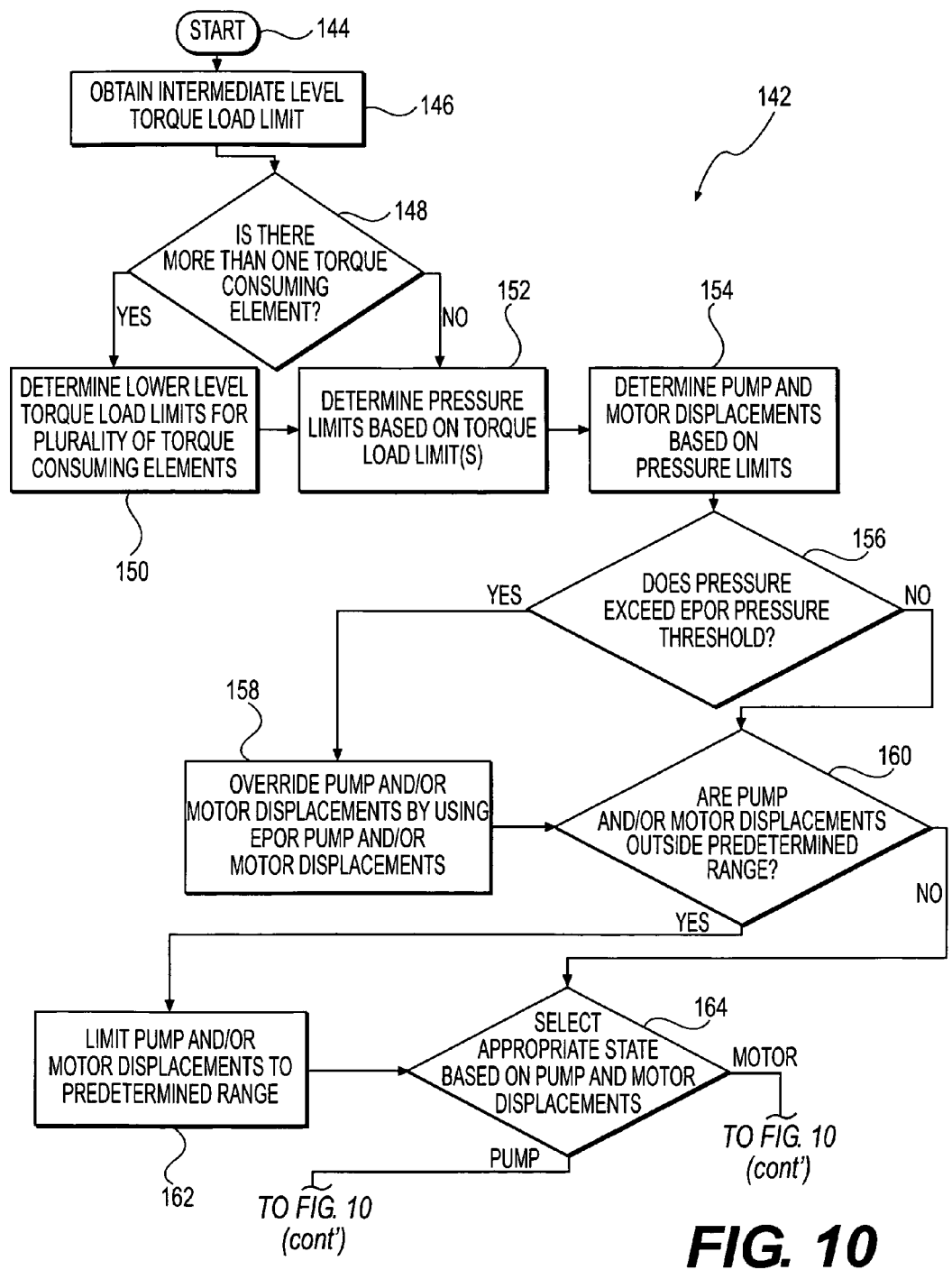
FIG. 10 is a flow diagram of a method according to yet another aspect of the disclosure.
Figure 10:
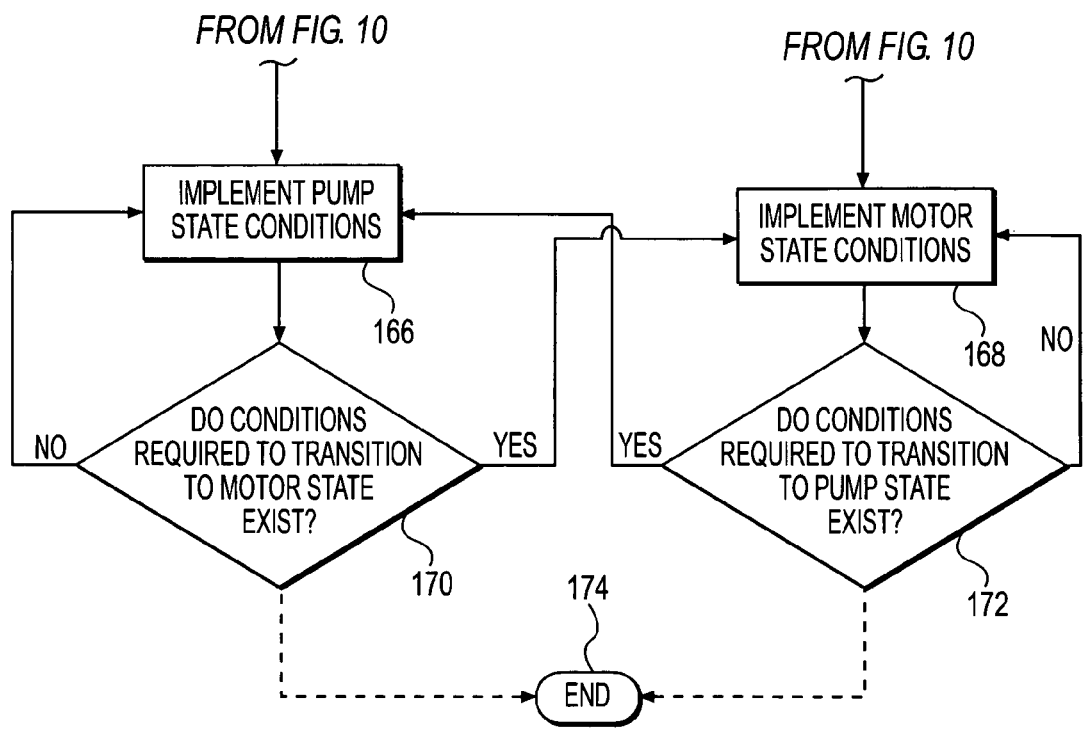

An exemplary method 142 performed using control system 54 will now be described, making reference to FIG. 10. Method 142 may begin at step 144, which may correspond to activation of machine 10. Step 146 may include obtaining the intermediate level torque load limit for a torque consuming device, such as dual path hydrostatic transmission 34. The intermediate level torque load limit may be obtained by torque allocation module 70. Step 148 may include determining if there is more than one torque consuming element in the torque consuming device. If so ("YES"), as in the case of dual path hydrostatic transmission 34 (which may include left and right side hydrostatic transmissions 40 and 42), step 150 may be performed, which may include determining lower level torque load limits for the plurality of torque consuming elements. The lower level torque load limits may be determined using the steps performed by torque allocation module 70. If there is only one torque consuming element ("NO"), or after step 150 has been performed, the next step 152 may include determining pressure limits based at least in part on the torque load limits. The pressure limits may be determined using the steps performed by left and right side feedback control modules 72 and 74, feedback control module 76, and torque control and pressure limit module 80.

Step 154 may include determining pump and motor displacements based at least in part on the pressure limits using, for example, the steps performed by displacement calculations module 90. Step 156 may include determining whether pressure in the one or more torque consuming elements exceeds an ePOR pressure threshold using the steps performed by ePOR displacement override module 92. If so, ("YES"), the pump and/or motor displacements may be overridden by ePOR pump and/or motor displacements at step 158. If not, ("NO"), step 160 may be performed.

Step 160 may include determining whether the pump and/or motor displacements are outside a predetermined range using the steps performed by displacement limiting module 94. If so, ("YES"), the pump and/or motor displacements may be limited to the predetermined range at step 162. If not ("NO"), or after step 162 has been performed, step 164 may be performed. Step 164 may include selecting an appropriate state based at least in part on the pump and motor displacements from displacement limiting module 94 using the steps performed by switching logic module 124.

If the pump state is selected, the conditions associated with that state may be implemented at step 166. If the motor state is selected, the conditions associated with that state may be implemented at step 168. The conditions associated with the pump and motor states may include those described in the discussion of switching logic module 124.

Step 170 may include determining whether the conditions required to transition to the motor state exist. The conditions required for transitioning have been described in the discussion of switching logic module 124. If so ("YES"), switching logic module 124 may change the conditions to those associated with the motor state. If not ("NO"), the logic may return to step 166.

Step 172 may include determining whether the conditions required to transition to the pump state exist. The conditions required for transitioning have been described in the discussion of switching logic module 124. If so ("YES"), switching logic module 124 may change the conditions to those associated with the pump state. If not ("NO"), the logic may return to step 168.

Any or all of the above steps in method 142 may be repeated while machine 10 is in operation, and may end (step 174) when machine 10 is turned off.

INDUSTRIAL APPLICABILITY

The disclosed control system 54 may have applicability in a machine 10 having a prime mover 12 configured to produce torque for one or more torque consuming devices 52. Control system 54 may have particular applicability in determining torque load limits and pressure limits related to prime mover 12 and torque consuming devices 52, and controlling their operation based at least in part on the limits.

When a torque load on prime mover 12 is excessive, its speed may decrease to or fall below an underspeed set point, causing prime mover 12 to be more susceptible to stalling. Control system 54 may be operable to prevent this type of overloading using a torque limiting algorithm. The torque limiting algorithm may determine torque load limits that prime mover 12 can handle without stalling, and control system 54 may control the operation of torque consuming devices 52 to ensure that prime mover 12 will not be overloaded.

However, torque consuming devices 52 may have their own limitations. For example, torque consuming devices 52 may be susceptible to being damaged if they are subjected to pressure levels that exceed their capacity. In some cases, controlling torque consuming devices 52 based solely on torque load limits can cause excessive pressure levels to develop in torque consuming devices 52. In order to avoid this, control system 54 may be operable to perform a pressure limiting algorithm. In doing so, control system 54 may take the pressure levels and pressure limits of torque consuming devices 52 into account, along with their torque load limits, when controlling the operation of torque consuming devices 52. By combining the torque limiting algorithm with the pressure limiting algorithm, control system 54 may ensure that overloading and excessive pressurization can both be avoided, thus enhancing the performance of machine 10 while also reducing wear or damage to torque consuming devices 52.

Further, by monitoring and using pressure levels in machine 10 as inputs, control system 54 may react more quickly to changes in demand or conditions than systems that rely on the speed of prime mover 12. In a speed based system, there may be a delay period between the moment that machine 10 experiences a change in demand, and the moment that the change in demand causes a change in the speed of prime mover 12. Thus, the change in demand may not be immediately recognized by the speed based system. However, the change in demand may have a more immediate effect on pressure levels in machine 10. Thus, by using pressure levels as inputs, faster reaction times for control system 54 may be achieved. As such, machine 10 may be more responsive, and may operate with greater efficiency.

Moreover, control system 54 may be operable to quickly reduce the pressure level in torque consuming devices 52 when they approach the pressure limits. Control system 54 may do so by overriding control elements once pressure levels reach a threshold. Once pressure levels are reduced sufficiently, control system 54 may cease overriding the control elements. The override capability of control system 54 may provide an additional safeguard that protects torque consuming devices 52 from being damaged.

What is claimed is:

1. An electronic control module for a machine including instructions for performing a method, the method comprising:
   determining a torque load limit for a torque consuming element;
   determining a pressure limit for the torque consuming element based at least in part on the torque load limit;
   determining a displacement for the torque consuming element based at least in part on the pressure limit; and
   operating the torque consuming element at the determined displacement.

2. The electronic control module of claim 1, wherein operating the torque consuming element at the determined displacement serves to maintain an amount of torque consumed by the torque consuming element at or below the torque load limit.

3. The electronic control module of claim 1, wherein operating the torque consuming element at the determined displacement serves to maintain a pressure level in the torque consuming element at or below the pressure limit.

4. The electronic control module of claim 3, wherein maintaining the pressure level at or below the pressure limit includes switching operation of the torque consuming element from a first state to a second state based at least in part on a difference between the pressure level in the torque consuming element and the pressure limit.

5. The electronic control module of claim 4, wherein operating the torque consuming element in the second state reduces the pressure level faster than operating the torque consuming element in the first state.

6. The electronic control module of claim 1, wherein determining the displacement for the torque consuming element includes obtaining a displacement for a component of the torque consuming element.

7. The electronic control module of claim 6, wherein determining the displacement for the torque consuming element includes determining if the obtained displacement falls outside of a first predetermined range, and if so, limiting the obtained displacement to a second predetermined range.

8. The electronic control module of claim 7, wherein the first predetermined range at least partially overlaps with the second predetermined range.

9. The electronic control module of claim 1, wherein determining the displacement for the torque consuming element includes determining whether conditions for a first state exist, wherein adjusting operation of a first component of the torque consuming element affects performance of the torque consuming element.

10. The electronic control module of claim 9, wherein determining the displacement for the torque consuming element includes determining whether conditions for a second state exist, wherein adjusting operation of a second component of the torque consuming element affects performance of the torque consuming element.

11. The electronic control module of claim 10, wherein determining the displacement for the torque consuming element includes selecting a displacement for the torque consuming element associated with the first state if conditions for the first state exist, and with the second state if conditions for the second state exist.

12. The electronic control module of claim 1, wherein operating the torque consuming element at the determined displacement serves to maintain a speed of a prime mover that provides torque to the torque consuming element within a predetermined range of operation.

13. A machine, comprising:
a prime mover configured to generate torque;
a torque consuming device configured to consume torque generated by the prime mover; and
a control system operable to:
obtain a torque load limit for a torque consuming element of the torque consuming device based at least in part on the torque generated by the prime mover,
obtain a pressure limit for the torque consuming element based at least in part on the torque load limit,
obtain a displacement for the torque consuming element based at least in part on the pressure limit, and
operate the torque consuming element at the obtained displacement.

14. The machine of claim 13, wherein the torque consuming device includes a traction assembly.

15. The machine of claim 14, wherein the traction assembly includes a left side traction assembly and a right side traction assembly.

16. The machine of claim 14, wherein the torque consuming element includes a transmission assembly configured to drive the traction assembly.

17. The machine of claim 16, wherein the transmission assembly includes a pump and a motor.

18. The machine of claim 17, wherein the control system is operable to obtain a pump displacement and a motor displacement, and operate the pump and the motor at the pump displacement and the motor displacement, respectively.

* * * * *